No. 754,751. PATENTED MAR. 15, 1904.
J. P. COWING.
CONICAL ROLLER BEARING.
APPLICATION FILED JULY 28, 1903.
NO MODEL.

WITNESSES:
Henry Henrichson.
J. D. Maley.

John P. Cowing INVENTOR

BY

James A. Joyce, ATTORNEY

No. 754,751. Patented March 15, 1904.

UNITED STATES PATENT OFFICE.

JOHN PHILO COWING, OF CLEVELAND, OHIO.

CONICAL ROLLER-BEARING.

SPECIFICATION forming part of Letters Patent No. 754,751, dated March 15, 1904.

Application filed July 28, 1903. Serial No. 167,289. (No model.)

*To all whom it may concern:*

Be it known that I, JOHN PHILO COWING, residing at Cleveland, in the county of Cuyahoga and State of Ohio, have invented a new and Improved Conical Roller-Bearing, of which the following is a clear, full, and exact description.

The object of the invention is to provide a bearing for heavy loads, which will distribute the load evenly over its supports and so arranged that it may be turned with as little power as possible, and having a rocker movement on the top, which will allow the load to rock while being turned, making it an easy and convenient bearing to turn heavy loads upon, such as engines, boilers, heavy bridge members, &c.

The invention consists of novel features and parts and combinations of the same, as will be fully described hereinafter and then pointed out in the claim.

A practical embodiment of the invention is represented in the accompanying drawings, forming a part of this specification, in which similar characters of reference indicate corresponding parts in both views.

Figure 2:
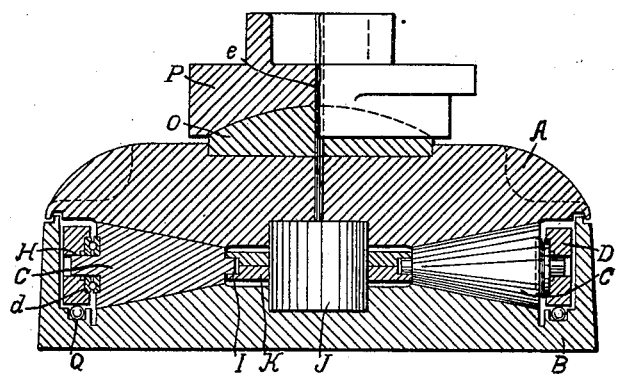
Figure 1:
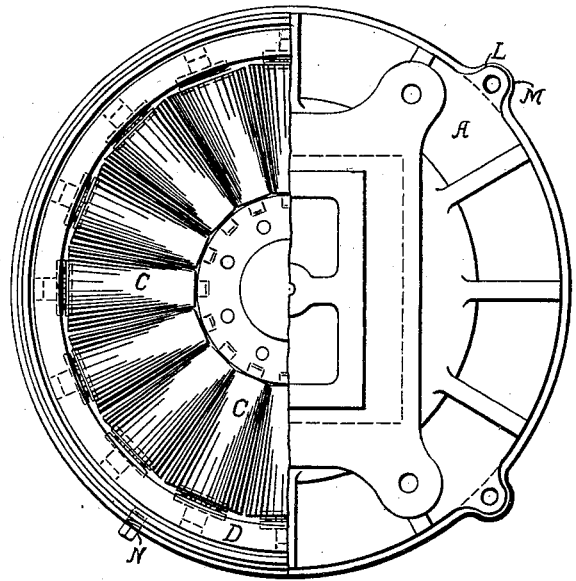

Figure 1 shows a top view of the center with one-half of the upper section removed to show an inside view. Fig. 2 shows a central vertical sectional view.

The conical roller-bearing illustrated in the drawings is provided with an upper section A and a lower section B, each of which has a wearing-surface arranged to bear evenly on a nest of conical rollers C, interposed between the said upper section A and the lower section B. The rollers C are arranged to rest and to roll on the wearing-surface of the lower section B. The upper section A is arranged to rest on the top of the nest of rollers, and when the bearing is turned around the rollers rest and roll on the bearing-surfaces of the upper and lower sections, thereby causing a purely roller-bearing.

The rollers are conical in shape, so that they will roll on the circular roller-bearing surface of the upper and lower sections of the bearing. The rollers are provided with a journal or trunnion at their inner and outer ends.
The journal H at the outer end of the rollers is arranged to support a rotative ring D. This ring is to take the thrust, due to the roller being conical. Each roller is provided with a bearing on the ring. The friction due to the roller-bearing on the ring may be reduced in several different ways, such as disks or annular rings $d$ to take the bearing; but I prefer to use in this case balls arranged to roll in annular grooves or ball-races. An annular ball-groove or ball-race is provided in each of the rings $d$, these rings being arranged in the rotative ring D and in the larger end of each roller. Balls are interposed between the two confronting annular grooves or ball-races. These balls provide an antifriction-bearing for the end of the roller. When the upper section A is revolved in a horizontal plane, the rollers revolve about their axis and carry the ring with them. The thrust produced by the rollers being taken by the rings offers little or no resistance to turning the upper section A with a heavy load upon it. These annular ball-races or grooves may be cut in the ring and rollers or they may be made in separate pieces and fitted into the ring and into the ends of the rollers, as shown.

The upper section A is provided with a rocker-piece O, which is flat on the under side and cylindrical on the upper side. To the upper side is fitted the support P for the load, which may be changed to suit the purposes for which the bearing is to be used, such as the end of a shaft, a pair of girders for an engine turn-table, a street-car turn-table, or, in fact, anything that is to be revolved in a horizontal plane, and the rocker adjustment on top will provide for any slight movement that may be necessary on account of the uneven settlement of masonry or the support for the bearing.

The upper section A is provided with an annular recess under the outer edge, which fits over the flange of the bottom section B, which prevents dust and water from entering the roller-chamber.

The lower section is provided with an annular upwardly-extending flange which forms a chamber for the rollers, ring, and other parts extending upwardly beyond the outer ends of the said rollers, the top of which fits into the annular recess in the upper section A, thereby forming a dirt-proof chamber which can be filled with oil and thereby allowing all parts to run completely immersed in oil. The lower section B has a recess Q, into which is placed a ball. Upon this ball the annular ring D rests and rolls, and by this means the weight of the ring is taken from the journals at the ends of the rollers and transferred to the ball, which provides an antifriction-bearing for the same.

The upper section A is provided with a recess, into which a pin J is inserted. The upper section A is pivotally fixed to pin J. This pin J holds the upper section A in a firm position, so that the upper section A cannot be knocked out of position.

The lower section B is provided with means to fasten it to its foundation. The said lower section B is made flat on the bottom, so that the load upon the center is distributed evenly over its support.

The inner end of each roller is provided with a journal I, which pivotally fits in circumferential grooves formed in the center rings K. These center rings are to keep the inner ends of the rollers in their proper position. The rings K are pivotally fitted to center pin J, which further holds the rollers in position.

The upper section A is provided with lugs L, which are used only to ship and to handle the completed center. They coincide with lugs M, which are used to secure the lower section B to the foundation; but for the purpose of keeping the center in its proper relative position a bolt is put through holes in the lugs L and M, and by this means the upper and lower sections are secured together with all the interior parts in their proper positions, which afford an easy and convenient method of shipping the completed center.

After the center reaches its destination the bolts are removed, and the lower section B is secured to the foundation and the upper section is free to revolve or turn in a horizontal plane. The center is intended to run in oil and is provided with a plug and outlet N, which serves to drain the oil off when it becomes necessary to put fresh oil in the center. A hole $e$ is provided at a convenient place in the upper section for putting in fresh oil.

Having thus fully described my invention, I claim as new and desire to secure by Letters Patent—

In a roller-bearing, the combination with the lower section having an inclined wearing-surface and an annular upwardly-extending flange, of an upper section having a wearing-surface inclined in the reverse direction to the wearing-surface of the said lower section, said upper section having an annular recess on its under side, which incloses the upper portion of the flange of the said lower section, a series of conical bearing-rollers arranged on the wearing-surface of the said lower section, and engaged by the wearing-surface of the said upper section, the said flange extending upwardly beyond the outer ends of the said rollers and entirely inclosing the same, a pin loosely mounted in the central recesses provided therefor in the lower face of the said upper section and upper face of the said lower section, respectively, center rings carried by said pin and arranged one above the other, the upper of the said rings having the lower portion of its periphery grooved, while the lower of said rings has the upper portion of its periphery grooved, the said grooves being adapted to receive the trunnions of the inner end of the said conical rollers, a rotative ring having apertures to receive trunnions on the outer ends of the said conical rollers, the said lower section having formed therein a recess arranged beneath the said rotative ring, antifriction-bearings arranged within the said recess, and antifriction-bearings between the ends of the said rollers and the said rotative ring, substantially as described.

JOHN PHILO COWING.

Witnesses:
E. W. DISSETTE,
MAMIE O. BETZ.